United States Patent [19]

Beer

[11] Patent Number: 5,112,542
[45] Date of Patent: May 12, 1992

[54] PROCESS AND APPARATUS FOR THE PRODUCTION OF A COMPONENT COMPRISING A SUPPORT ELEMENT AND FOAM PORTIONS ON RESPECTIVE SIDES THEREOF

[75] Inventor: Johann Beer, Schirmitz, Fed. Rep. of Germany

[73] Assignee: Grammer AG, Amberg, Fed. Rep. of Germany

[21] Appl. No.: 652,068

[22] Filed: Feb. 7, 1991

[30] Foreign Application Priority Data

Sep. 27, 1990 [DE] Fed. Rep. of Germany ....... 4030547

[51] Int. Cl.⁵ ............................................. B29C 67/22
[52] U.S. Cl. ................................. 264/46.7; 264/46.8; 264/254; 264/338
[58] Field of Search ................... 264/46.7, 46.8, 46.4, 264/46.6, 45.1, 338, 254, 271.1

[56] References Cited

U.S. PATENT DOCUMENTS

| | | | |
|---|---|---|---|
| 3,534,129 | 10/1970 | Bartel | 264/46.4 |
| 4,420,447 | 12/1983 | Nakashima | 264/46.7 |
| 4,544,126 | 10/1985 | Melchert | 264/46.7 |
| 4,806,088 | 2/1989 | Busch et al. | 264/46.8 |
| 5,011,394 | 4/1991 | Katagiri et al. | 264/46.4 |

FOREIGN PATENT DOCUMENTS

| | | | |
|---|---|---|---|
| 2610729 | 9/1977 | Fed. Rep. of Germany | 264/46.7 |
| 59-020636 | 2/1984 | Japan | 264/46.7 |
| 61-035912 | 2/1986 | Japan | 264/46.7 |
| 2009022 | 6/1979 | United Kingdom | |

Primary Examiner—Robert A. Dawson
Assistant Examiner—Allan R. Kuhns
Attorney, Agent, or Firm—Elliott M. Olstein; Raymond J. Lillie

[57] ABSTRACT

In a process and apparatus for the production of a component including a support element and foam portions adhering to the top and bottom surfaces thereof, the support element is arranged with its bottom surface over a first mold cavity of a mold. A cover is then sealingly fixed on the mold in such a way that a second mold cavity is defined between the cover and the support element. A first reaction mixture is introduced into the second mold cavity and reacts to form a first foam portion on the top surface of the support element. The cover with support element and first foam portion are then removed from the first mold cavity. Thereupon a second reaction mixture is introduced into the first mold cavity which is then immediately sealingly closed again by the unit consisting of the cover and the support element with its first foam portion. The second reaction mixture reacts to fill the first mold cavity, forming the second foam portion which is mechanically firmly bonded to the bottom surface of the support element. The mold cover can then be removed from the mold, followed by removal of the finished component.

5 Claims, 7 Drawing Sheets

PROCESS AND APPARATUS FOR THE PRODUCTION OF A COMPONENT COMPRISING A SUPPORT ELEMENT AND FOAM PORTIONS ON RESPECTIVE SIDES THEREOF

BACKGROUND OF THE INVENTION

The invention relates generally to a process for the production of a construction component and an apparatus for carrying out such a process.

In a process for the production of a sun visor with mirror, for example, as disclosed in GB-A-20 09 022, a foil provided with an opening is introduced into a first mold cavity in a mold, in a first step in the process. The edge of the opening in the foil is strengthened by a frame-like strengthening element. In a second step in the process, a flat-surfaced mirror element is disposed on the opening and on the frame-like strengthening element around the edge thereof. The mirror element is accurately fixed in position on the foil with the strengthening element, by connection of a vacuum source to the mold. A reaction mixture is then introduced into the first mold cavity in the mold, on the rear side of the mirror element, and immediately thereafter the first mold cavity of the mold is covered with a second foil and the mold and more specifically the first mold cavity thereof is closed with a cover. When reaction of the reaction mixture occurs, the reaction mixture foams up so as to fill out the whole of the central space defined by the mold and the cover. After the reaction has occurred, the cover can be removed from the mold and the sun visor can then be taken out of the mold. The edge portions of the two foils, which were clamped fast in position between the mold and the cover, are then cut off. That process is suitable for producing a foam backing on the rear of a flat element of stable shape, being a mirror element in the specific procedure referred to above.

SUMMARY OF THE INVENTION

An object of the present invention is to provide a process for the production of a construction component comprising a flat central element of stable shape and foam portions adhering to the top and bottom surfaces thereof, which can produce accurate components within a short operating cycle time.

Another object of the present invention is to provide a process for the production of a construction component comprising a central element and foam portions adhering to the surfaces thereof, which can be carried into effect by a simple apparatus structure and in a simple operating procedure.

Yet another object of the present invention is to provide an apparatus for the production of a construction component comprising a flat central element and foam portions thereon, which is of a simple design configuration as well as being simple in terms of operating procedure while also being easy to automate.

A still further object of the present invention is to provide an apparatus for the production of a construction component comprising a central element with foam portions at respective sides thereof, which is of accurate dimensions.

In accordance with the present invention, in a first aspect thereof, the foregoing and other objects are achieved by a process for the production of a construction component comprising a flat central element of a stable shape and foam portions adhering to the top and bottom surfaces thereof, wherein the central element is arranged by means of its bottom surface on a first mold cavity in a mold, whereupon a cover is sealingly fixed on the mold in such a way that a second mold cavity is defined between the cover and the top surface of the central element disposed on the first mold cavity. A first reaction mixture is then introduced into the second mold cavity through a runner gate. After reaction has occurred, the first reaction mixture forms a first foam portion which is firmly bonded to the top surface of the central element. The cover with the central element and the first foam portion thereon is then removed as a joint unit from the first mold cavity and then a second reaction mixture is introduced into the first mold cavity and the first mold cavity is immediately then sealingly closed again with the unit consisting of the cover, the central element and the first foam portion thereon, so that when the reaction occurs the second reaction mixture fills the first mold cavity and is mechanically firmly bonded to the bottom surface of the central element. The cover is then removed from the first mold cavity, with the central element having the two foam portions thereon remaining on the first mold cavity. The component consisting of the central element and the foam portions firmly adhering to the two main surfaces of the central element is then removed from the first mold cavity.

The above-defined process in accordance with the invention provides the advantage that the flat central element does not therefore need to be turned through an angle of 180° in order to be provided with a firmly adhering foam portion both on its bottom surface and on its top surface. The process according to the invention can therefore be readily carried into effect with an apparatus which is of a simple design configuration, the process can be easily automated, and the operating cycle times involved in the production of such components can be short. It will be appreciated that those factors have an advantageous effect on the production costs of the components involved. Another major advantage is that the configuration of the two foam portions between which the flat central element is disposed can be produced in a highly accurate fashion in relation to the central element, in other words, it is possible to arrive at an exact positional association as between the central element and the foam portions.

It may be noted at this point that the component produced by the process according to the invention may involve any structural or construction component of a triple-layer configuration, comprising a flat support element which is inherently stable and foam portions disposed on respective sides thereof. The process according to the invention can be used to particular advantage for the production of components which are used in the motor vehicle industry as engine compartment insulating elements.

In a preferred feature of the invention, in order to ensure that the second reaction mixture which is introduced into the first mold cavity between the cover and the central element does in fact adhere mechanically firmly to the central element but not to the inside surface of the cover, the inside surface of the cover which in part defines the second mold cavity is covered with a separating agent before the cover is disposed on the first mold cavity and over the central element. For that purpose, in a preferred feature, the inside surface of the cover may be sprayed with a separating agent to provide a layer thereof. It would likwise be possible to use a separating foil or film on the surface of the cover.

So that the finished component can be easily removed from the mold after all the operating steps in the process have been carried out, a preferred feature of the invention provides that the inside surface of the mold, which in part defines the first mold cavity, is covered with a separating agent prior to the second reaction mixture being introduced. In that connection, it has been found advantageous for the inside surface of the first mold cavity to be covered with a foil which is capable of being deep-drawn and foam-backed and which is sucked to bear snugly in a fold-free manner against the inside surface of the first mold cavity. That procedure results in a component in which the second foam portion which is fixed to the bottom surface of the flat central element is covered with a foil or film while the first foam portion which is fixed to the top surface of the central element has a bare surface comprising the foam material.

In accordance with the present invention, in a further aspect thereof, the foregoing and other objects are achieved by an apparatus for the production of a construction component comprising a flat central element which is of stable shape and which has bottom and top surfaces and foam portions adhering to the bottom and top surfaces of the central element, wherein the apparatus comprises a mold having a first mold cavity and a cover for sealingly closing the mold cavity. The mold further includes a lift frame which surrounds the top opening of the first mold cavity of the mold, the central element being arranged with the peripherally extending edge portion of its bottom surface sealingly on the lift frame of the apparatus. The cover with a second mold cavity can be mechanically firmly and sealingly connected to the lift frame, disposed over the central element.

Such an apparatus configuration means that it is possible for the cover in conjunction with the lift frame and the flat central element lying on the latter to form on the one hand a second mold cavity for receiving a first reaction mixture, while on the other hand the above-indicated structure comprising the cover, central element and second reaction mixture or foam portion made from the second reaction mixture can form the cover for the first mold cavity of the mold. Therefore, as already indicated above, there is no need for the central element to be turned through an angle of 180° in order for a respective foam portion to be produced in mechanically firmly bonded relationship on the bottom and top surfaces of the central element.

In a preferred feature of the apparatus according to the invention, the cover is provided with a runner gate which opens into the second mold cavity. It will be appreciated that it would also be possible for the cover to be provided with more than one such runner gate.

In another preferred feature of the apparatus according to the invention, the mold is provided with suction ducts which open into the first mold cavity in order for a foil which is capable of being foam-backed to be caused to bear snugly and in a fold-free manner by suction against the inside surface of the first mold cavity, while the mold is adapted to be connected to a vacuum source. By virtue of a vacuum being applied to the mold, by way of the suction ducts, it is possible for the foam-backable foil to be sucked precisely into contact against the inside surface of the first mold cavity, whereupon immediately thereafter the second reaction mixture can be introduced into the first mold cavity.

In another preferred feature of the invention, precisely correct positioning of the foam-backable foil relative to the first mold cavity in the mold is achieved if the mold includes a clamping frame which is provided for fixedly clamping the foil for lining the first mold cavity, with the clamping frame being actuable independently of the lift frame. Preferably the clamping frame extends around the lift frame at a small spacing therefrom so that the two frames do not interfere with each other.

Preferably, the lift frame is connected to a lifting means so that either the lift frame can be lifted up from the mold with the cover, the flat central element and the first reaction mixture or first foam portion, or so that in virtually the last operating step in the process the central element with the two foam portions firmly bonded thereto can be released from the mold, more specifically the first mold cavity.

Further details, features and advantages of the present invention will be more clearly apparent from the following description of a preferred embodiment of the apparatus according to the invention and the individual successive steps in the process for the production of a construction component.

DESCRIPTION OF THE PREFERRED EMBODIMENT

Figure 1:
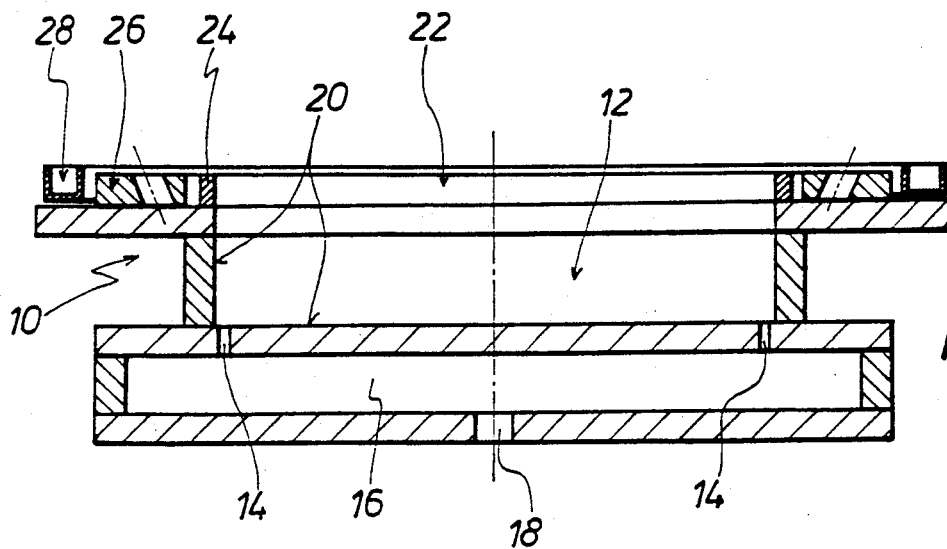
FIG. 1 is a diagrammatic view in section through part of the apparatus according to the invention showing the mold with the first mold cavity, lift frame and clamping frame.

Referring firstly to FIG. 1, shown therein is a diagrammatic view of part of an apparatus for carrying out a process according to the invention for the production of a component comprising a flat central element which is of a stable shape, and foam portions adhering to top and bottom surfaces thereof. As illustrated the apparatus comprises a mold which is generally identified by reference numeral 10 and which provides a first mold cavity 12 which is in fluid communication by way of suction ducts 14 with a space or chamber 16. The space or chamber 16 can in turn be in fluid communication by way of an opening 18 with a vacuum source (not shown).

Reference numeral 20 identifies an inside surface defining the first mold cavity 12 in the mold 10. The suction ducts 14 communicate with the first mold cavity 12 of the mold 10, by opening thereinto at the inside surface 20. The upward opening 22 of the first mold cavity 12 is defined by a collar element 24 extending therearound. Disposed radially outwardly of the peripheral collar element 24 on the mold 10 is a lift frame 26, the function of which will be described in greater detail hereinafter. Disposed radially outwardly of the lift frame 26 and at a spacing therefrom is a clamping frame 28, the function of which will also be described in greater detail hereinafter.

Figure 2:
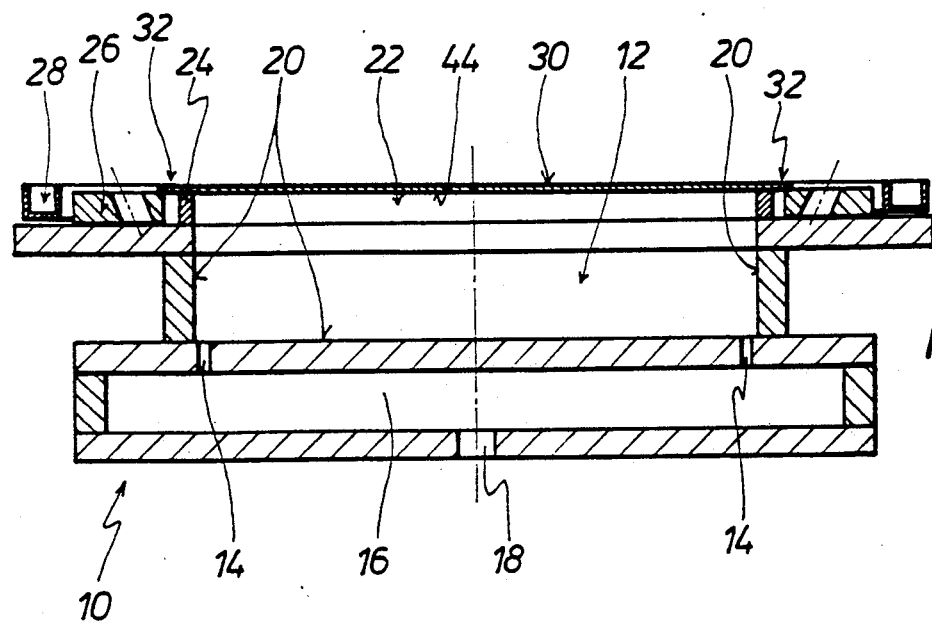
FIG. 2 is a sectional view similar to that shown in FIG. 1, also showing the flat central element of stable shape, disposed on the mold.

The sectional view in FIG. 2 differs from that shown in FIG. 1 more particularly in that a flat central element 30 which is inherently stable, that is to say which is of a stable shape, is arranged on the lift frame 26 and on the peripheral collar element 24 which is radially spaced from the lift frame 26. The central element 30 is supported on the lift frame 26 and the collar element 24 by means of a peripherally extending edge portion 32 of the central element 30. In other respects the same components in FIGS. 1 and 2 are respectively identified by the same reference numerals.

As will be seen from FIG. 2, the top opening 22 of the first mold cavity 12 of the mold 10 is closed in the operating step of the process as illustrated in FIG. 2, by the presence of the flat central element 30. The collar element 24 is of the same height in the axial direction of the mold cavity 12 as the lift frame 26 so that the central element 30 bears in a flat condition both against the collar element 24 and also the lift frame 26, while extending around the top opening 22 of the mold cavity 12.

FIGS. 1 and 2 show the central element in the form of a flat sheet of material but it will be appreciated that the central element 30 may also be of any other configuration. If the central element 30 is of a configuration which differs from a plate-like shape, it is only necessary for the peripherally extending collar element 24 and the lift frame 26 each to have a surface contour which is adapted in terms of shape to the peripherally extending edge portion of the central element 30.

Figure 3:
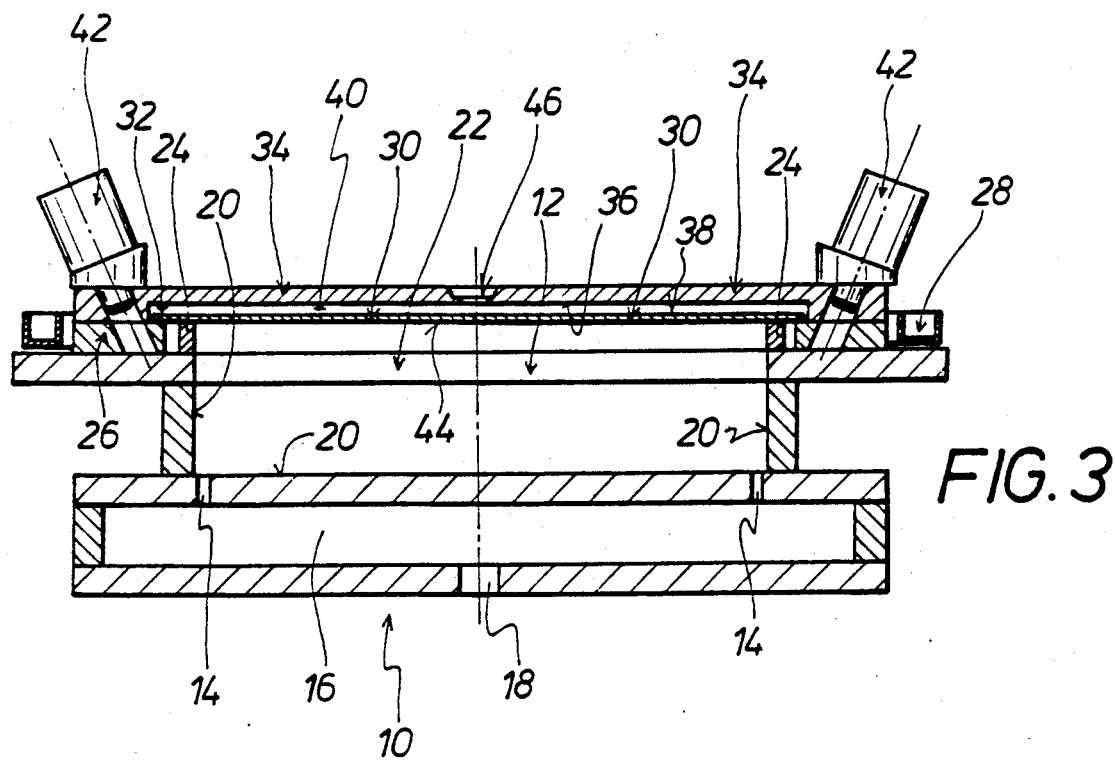
FIG. 3 is a sectional view which, besides the mold and the central element thereon, as illustrated in FIG. 2, also shows the cover serving to define a second mold cavity.

The view illustrated in FIG. 3 differs from that shown in FIG. 2 in that a cover 34 has been positioned on the mold 10 and over the flat central element 30 thereon, in precisely the correct position, that is to say accurately positioned in relation to the lift frame 26. The cover 34 has an inside surface 36 which, in conjunction with the top surface indicated at 38 of the central element 30, defines a second mold cavity which is indicated at 40 when the cover 34 is sealingly fixed to the lift frame 26, as indicated in FIG. 3 by the presence of the fixing elements 42. The bottom surface of the central element 30 which is in opposite relationship to the top surface 38 thereof is identified by reference numeral 44 in the Figures of drawings.

Figure 4:
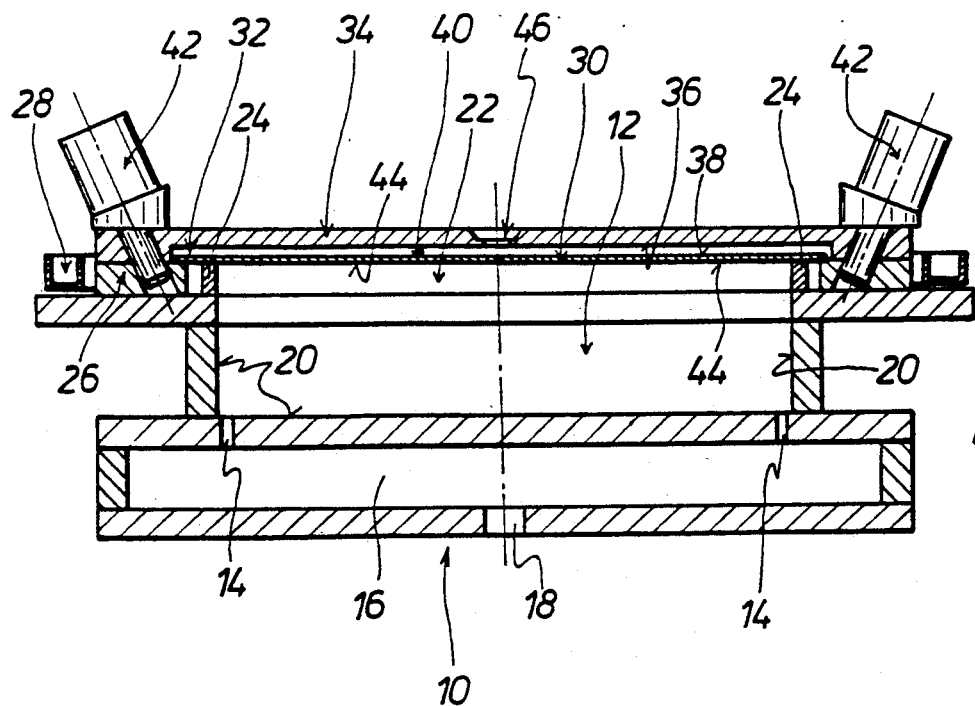
FIG. 4 is a sectional view similar to that shown in FIG. 3, showing the sealing fixing of the cover to the lift frame.

In FIGS. 3 and 4, the same components as those appearing in FIGS. 1 and 2 are identified by the same references.

Figure 5:
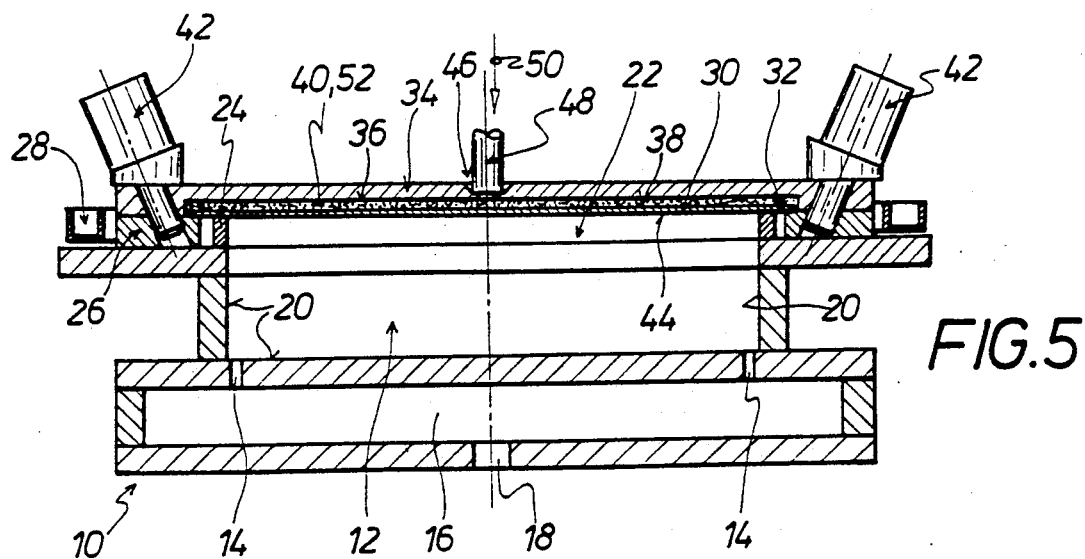
FIG. 5 is a sectional view corresponding to that shown in FIG. 4, illustrating the operating step of introducing a first reaction mixture into the second mold cavity and foaming thereof.

It will be clearly seen from FIGS. 3 and 4 that the cover 34 is provided with at least one runner gate or feed opening 46 through which a reaction mixture can be introduced into the second mold cavity 40 by means of a pouring head 48 of which a part is shown in FIG. 5. The introduction of the reaction mixture into the second mold cavity 40 is diagrammatically indicated by the arrow 50 in FIG. 5. When reaction of the reaction mixture which is for example a polyurethane foam material occurs, the reaction mixture foams up so that it completely fills the second mold cavity 40, thereby forming a first mold portion 52. In that connection, the procedure is such that the first foam portion 52 is mechanically firmly bonded to the top surface 38 of the central element 30. A mechanically firm bonding of that kind between the first foam portion 52 and the cover 34 and more specifically the inside surface 36 thereof is prevented, for example by the inside surface 36 of the cover 34 being coated with a suitable separating agent which may be for example sprayed thereon, or which may be in the form of a separating foil applied to the inside surface 36 of the cover 34.

Figure 6:
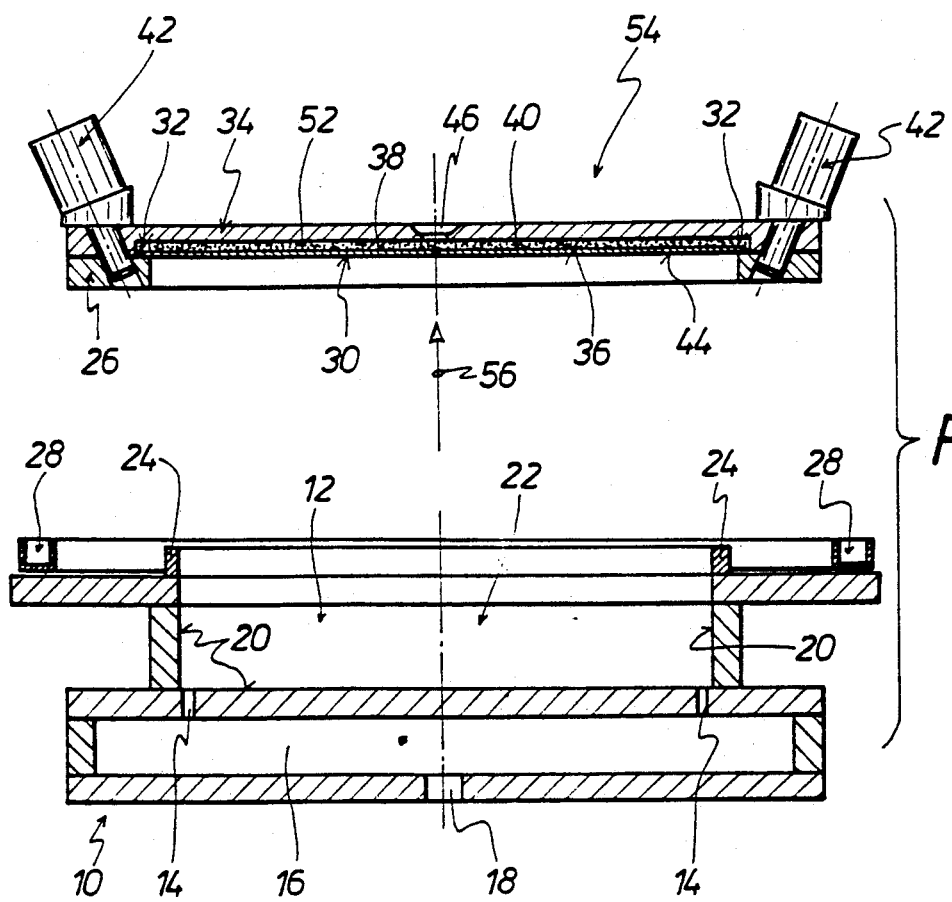
FIG. 6 is a sectional view of part of the apparatus in a process step in which the cover with the lift frame, the central element and the first foam portion is lifted as a unit off the mold.

As soon as the reaction mixture introduced into the second mold cavity 40 has reacted, thus forming the first foam portion 52, the unit which is identified by reference numeral 54 in FIG. 6 and which comprises the lift frame 26, the cover 34 which is connected to the lift frame 26 by the fixing elements 42 and the laminate structure consisting of the central element 30 and the first foam portion 52, which is fixed between the lift frame 26 and the cover 34, can be removed from the mold as indicated by the arrow 56 in FIG. 6. That results in the top opening 22 of the first mold cavity 12 of the mold 10 being opened, in a manner which is readily apparent from FIG. 6.

Figure 7:
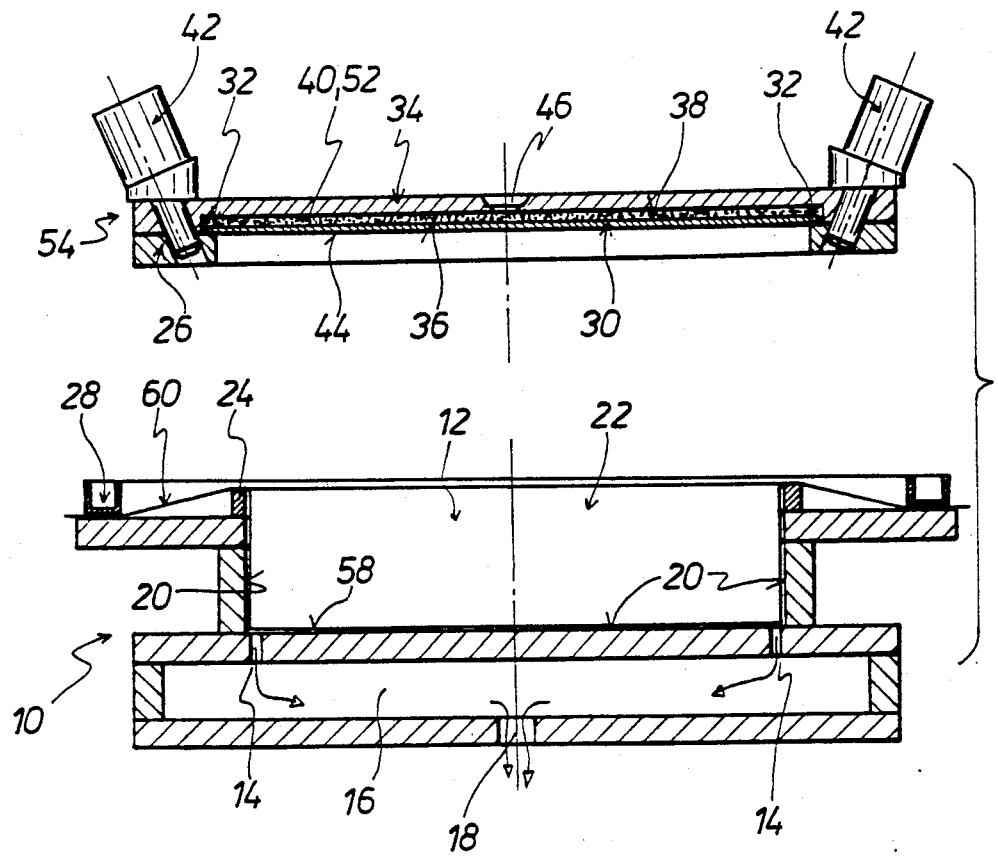
FIG. 7 is a sectional view of the apparatus in the operating step in which, with the unit consisting of the cover, lift frame and central element with first foam portion lifted off the mold, a foam-backable foil is introduced into the first mold cavity of the mold, to bear snugly against the surface thereof.

Looking now at FIG. 7, in the next step in the process, it is possible to arrange a foil 58 which is capable of being foam-backed on the mold 10, that is to say on the top opening 22 of the mold cavity 20 in the mold 10. The foil 58 is clamped fast in position between the mold 10 and the clamping frame 28 which is provided for that purpose, by virtue of the edge portion 60 extending around the foil being suitably clamped fast. Then, a vacuum is applied to the first mold cavity 12 by operation of the vacuum source (not shown) through the opening 18, the space or chamber 16 which is in fluid communication therewith and the suction ducts 14 which are in fluid communication with the space or chamber 16. The vacuum causes the foil 58 to be sucked against the inside surface 20 of the first mold cavity 12 in the mold 10, in such a way that the foil 58 bears snugly and without folds against the inside surface 20 of the mold cavity, as indicated in FIG. 7.

Figure 8:
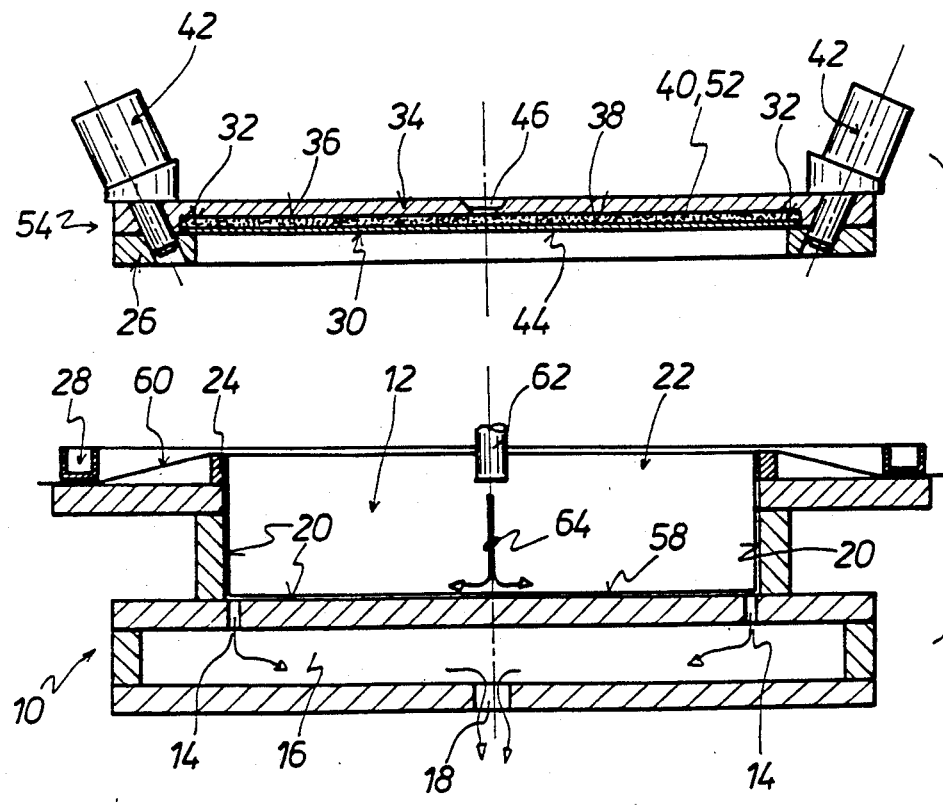
FIG. 8 is a sectional view of the apparatus in the process step in which the foil which is sucked into snug contact against the inside surface of the first mold cavity is foam-backed with a reaction mixture.
Figure 9:
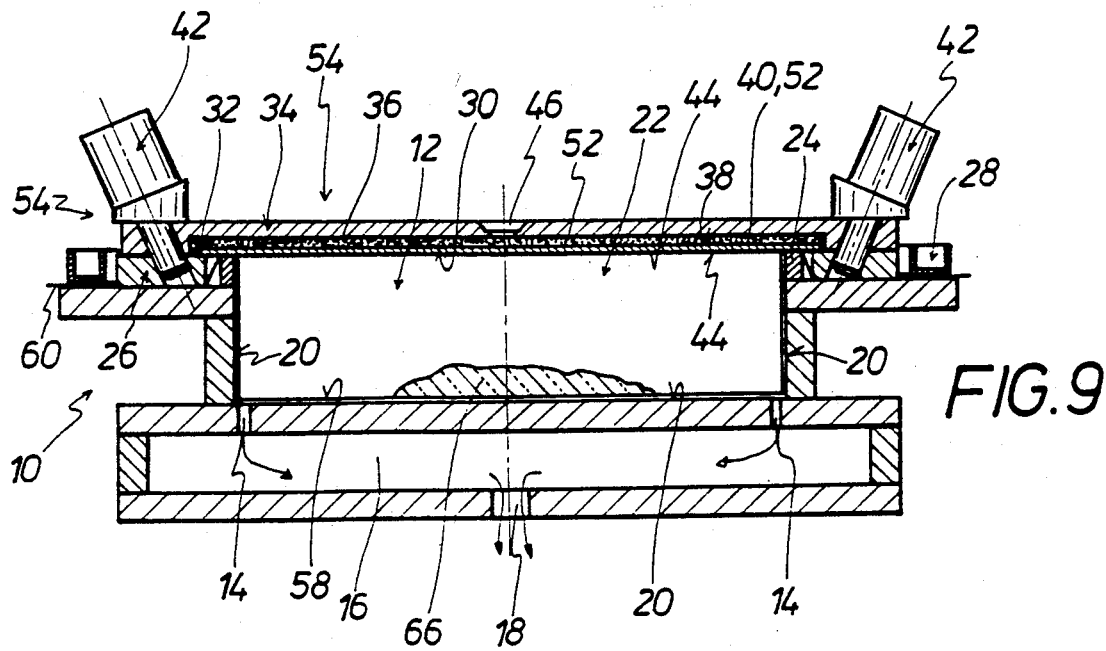
FIG. 9 is a sectional view of the apparatus in the process step in which the mold is sealingly closed by the unit consisting of the cover, lift frame, central element and first foam portion thereon, after the second reaction mixture has been introduced into the first mold cavity in the mold.
Figure 10:
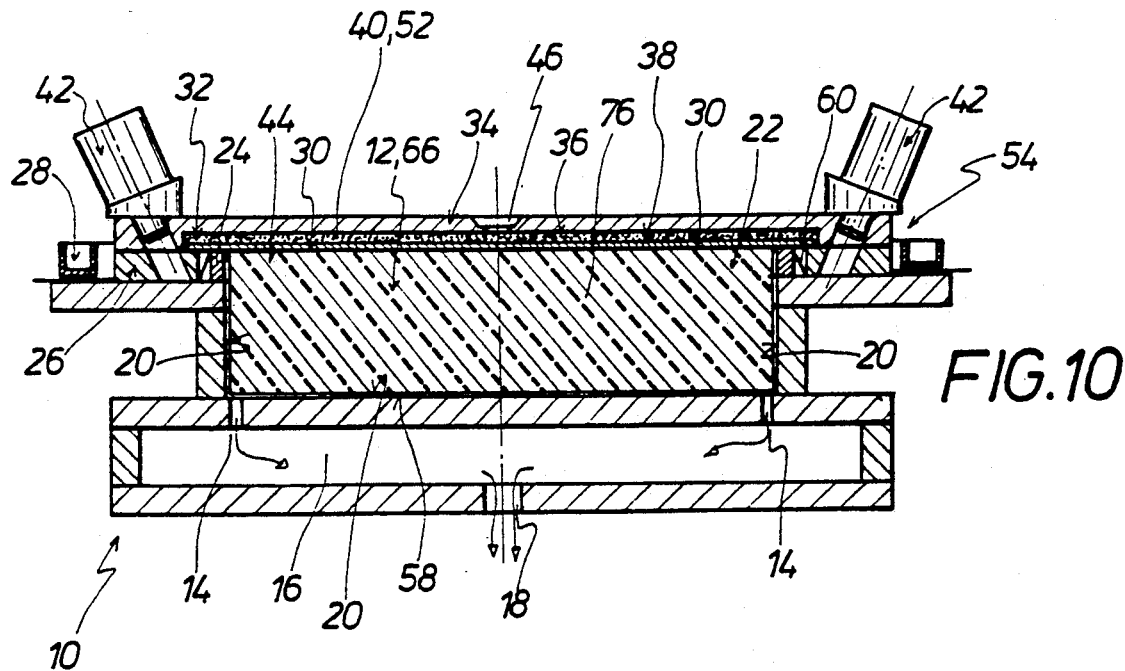
FIG. 10 is a sectional view of the apparatus in the condition in which the second reaction mixture completely fills the first mold cavity after reaction has occurred, with the cover being shown as already released again from the lift frame.

In the next step in the process according to the present invention, as shown in FIG. 8, a reaction mixture is introduced into the first mold cavity 12 by means of a pouring head 62 of which part is shown, as indicated by the arrows 64. Immediately after the reaction mixture has been introduced in that way, the head 62 is removed from the top opening 22 of the first mold cavity 12 of the mold 10 and the top opening 22 is closed again by arranging on the mold 10 the unit 54 comprising the cover 34, the lift frame 26, the central element 30 and the first foam portion 52 which is firmly bonded to the top surface 38 of the central element 30. With the unit 54 in that sealing position on the mold 10, the reaction mixture which has been introduced into the first mold cavity 12 can be foamed up, as diagrammatically indicated in FIG. 10. The foamed reaction mixture is mechanically firmly bonded both to the bottom surface 44 of the central element 30 and also to the foam-backable foil 58 lining the inside surface of the first mold cavity 12. After reaction of the second reaction mixture 66 has occurred, a second foam portion is consequently formed, as indicated generally by reference numeral 68 in FIG. 10, which is mechanically firmly connected to the central element 30 and the foam-backable foil 58.

Figure 11:
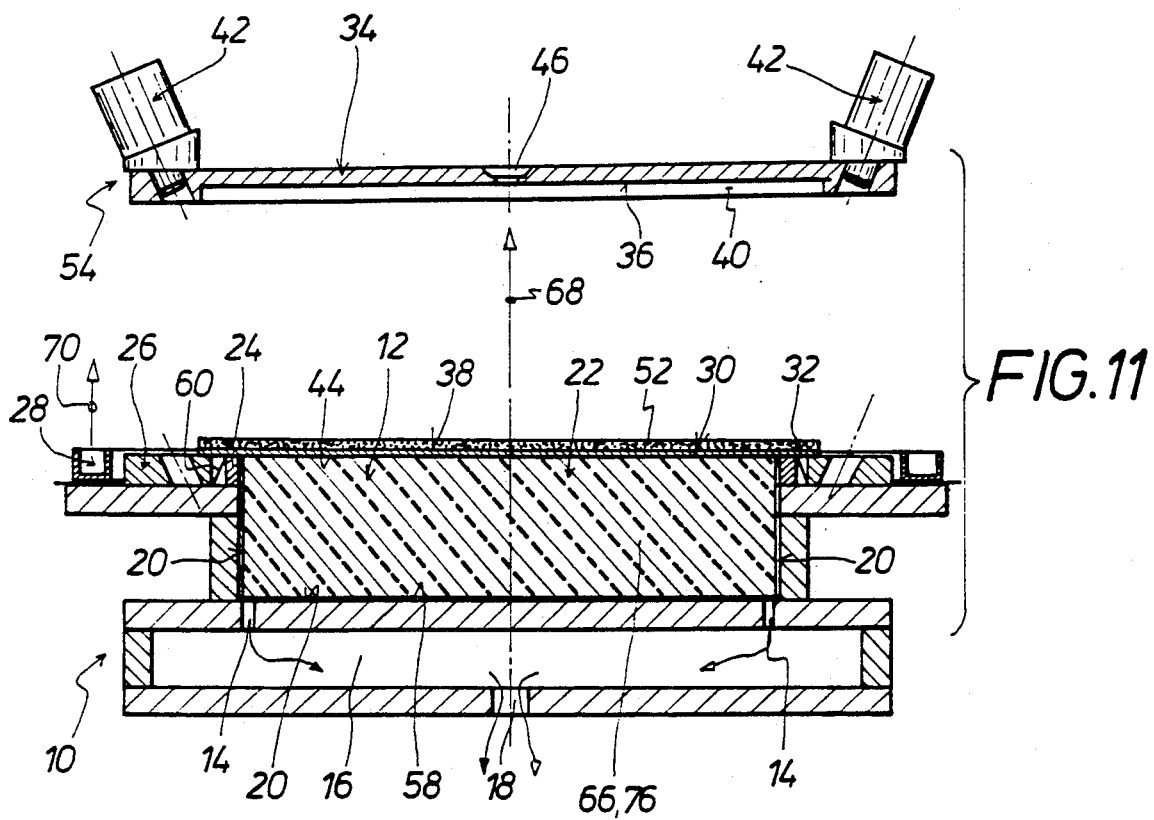
FIG. 11 is a sectional view showing the step in the process subsequent to the step shown in FIG. 10, with the cover being released from the mold and the clamping frame also being released from the mold.

Then, that is to say after reaction of the second reaction mixture 66 has taken place, the cover 34 can be released from the lift frame 26 and lifted off the mold 10, as indicated by the arrow 68 in FIG. 11. Subsequently thereto, the clamping frame 28 is also removed from the mold 10 as indicated by the arrow 70 in FIG. 11.

Figure 12:
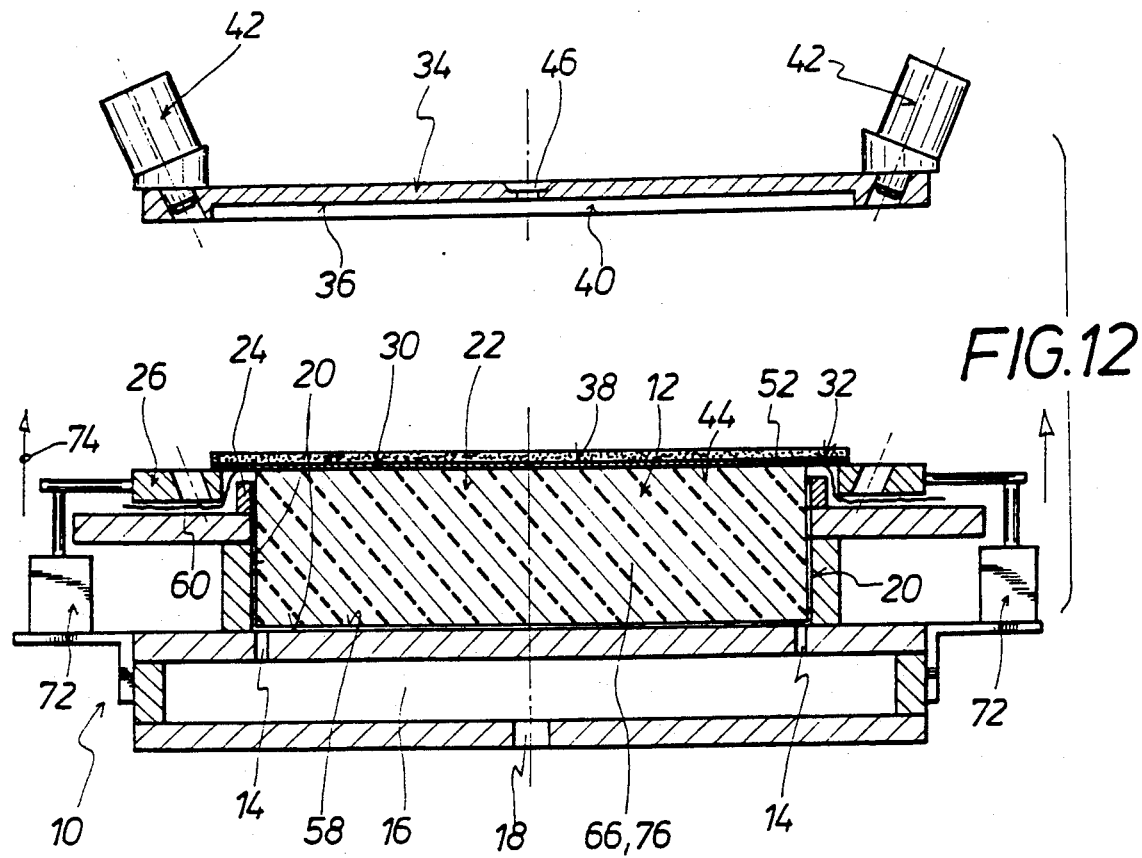
FIG. 12 is a sectional view of the apparatus illustrating the process step in which the lift frame and consequently the construction component produced by the process of the invention is lifted out of the mold.

In the next step in the process, the lift frame 26 is lifted off the mold 10 by means of a lifting device 72, as indicated by the arrow 74 in FIG. 12. As a result of that movement, it is possible for the edge portion 60 which extends around the periphery of the foil 58 to slip radially inwardly, thus preventing damage to the foam-backable foil 58 at the peripheral edge portion 60 thereof. It will further be noted at this point that the foil 58 is also capable of experiencing deep drawing so as readily to permit it to be sucked into a position of bearing snugly and in a fold-free manner against the inside surface of the first mold cavity 12.

Figure 13:
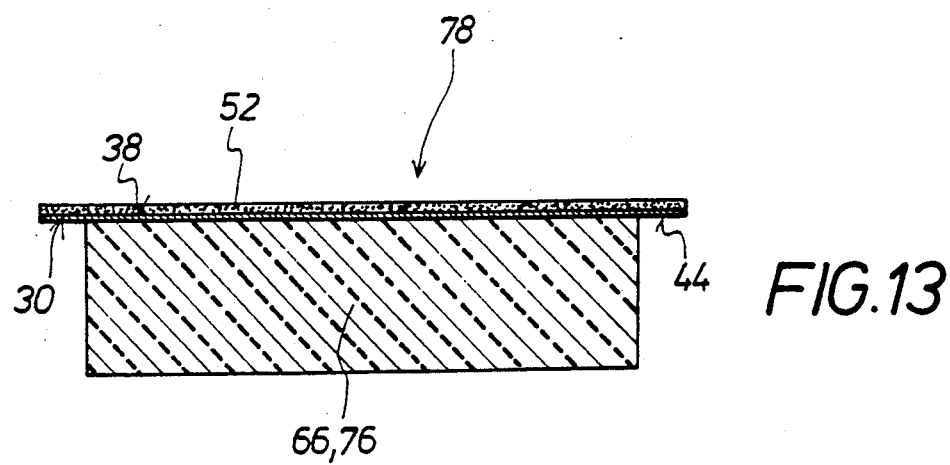
FIG. 13 is a sectional view of the finished component produced by the operating steps illustrated in FIGS. 1 through 12.

In the next step in the process, the finished component as indicated generally by reference numeral 78 in FIG. 13 can then be removed from the mold.

The central element 30 may be for example a portion of sheet material such as sheet metal while the first foam portion 52 which is produced on the top surface 38 of the central element 30 in firmly bonded relationship therewith comprises for example barite. The second foam portion 76 which is bonded to the bottom surface 44 of the central element 30, by being foamed from the second reaction mixture 66, preferably comprises a foam capable of absorbing sound waves.

It will be appreciated that the same references are used in each of FIGS. 5 through 12 to identity the same elements and members.

It will also be noted that the references to the element 30 being central mean that it is disposed between the foam portions on respective sides thereof, to support same, and thus accordingly the term central is not to be interpreted narrowly in a strict geometrical sense.

It will be further appreciated that the above-described process and apparatus according to the invention have been set forth solely by way of example and illustration thereof and that various other modifications and alterations may be made therein without thereby departing from the spirit and scope of the invention.

I claim:

1. A process for the production of a component comprising an at least substantially flat support element which is of a stable shape and has first and second surfaces with foam portions adhering to the surfaces of the support element, wherein: the support element is arranged with its first surface over a first mold cavity of a mold; a cover is sealingly fixed on the mold in such a way that a second mold cavity is defined between the cover and the second surface of the support element; a first reaction mixture is then introduced into the second mold cavity through a runner gate, reaction of the first reaction mixture forming a first foam portion which is firmly bonded to the second surface of the support element; the cover with the support element and its first foam portion is removed as a joint unit from the first mold cavity; a second reaction mixture is introduced into the first mold cavity; the first mold cavity is immediately then sealingly closed again with the unit consisting of the cover with the support element and its first foam portion so that when the reaction occurs the second reaction mixture fills the first mold cavity and forms the second foam portion which is mechanically firmly bonded to the second surface of the support element; the cover is removed from the first mold cavity, the support element with the first and second foam portions remaining on the first mold cavity; and thereupon the component consisting of the support element and the foam portions adhering to the two main surfaces thereof is removed from the first mold cavity.

2. A process as set forth in claim 1 wherein an inside surface of the cover which in part defines the second mold cavity is covered with a separating agent before the cover is arranged over the first mold cavity.

3. A process as set forth in claim 2 wherein the inside surface of the cover is sprayed with a separating agent.

4. A process as set forth in claim 1 wherein an inside surface of the mold which in part defines the first mold cavity is covered with a separating agent prior to the introduction of the second reaction mixture.

5. A process as set forth in claim 4 wherein the inside surface of the first mold cavity is covered with a foil which is capable of being deep-drawn and foam-backed and wherein the foil is sucked to bear snugly in a fold-free manner against the inside surface of the first mold cavity prior to the introduction of the second reaction mixture.

* * * * *